US010414998B2

(12) United States Patent
Zhao

(10) Patent No.: US 10,414,998 B2
(45) Date of Patent: Sep. 17, 2019

(54) ORGANIC FRICTION MODIFIERS

(71) Applicant: HUNTSMAN PETROCHEMICAL LLC, The Woodlands, TX (US)

(72) Inventor: Haibo Zhao, The Woodlands, TX (US)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 0 days.

(21) Appl. No.: 15/540,492

(22) PCT Filed: Mar. 2, 2016

(86) PCT No.: PCT/US2016/020323
§ 371 (c)(1),
(2) Date: Jun. 28, 2017

(87) PCT Pub. No.: WO2016/140998
PCT Pub. Date: Sep. 9, 2016

(65) Prior Publication Data
US 2018/0023020 A1 Jan. 25, 2018

Related U.S. Application Data

(60) Provisional application No. 62/128,092, filed on Mar. 4, 2015.

(51) Int. Cl.
*C10M 149/12* (2006.01)
*C10M 133/56* (2006.01)
*C08G 81/02* (2006.01)
*C10M 105/00* (2006.01)
*C10M 169/04* (2006.01)

(52) U.S. Cl.
CPC ......... *C10M 149/12* (2013.01); *C08G 81/025* (2013.01); *C10M 105/00* (2013.01); *C10M 133/56* (2013.01); *C10M 169/04* (2013.01); *C10M 2203/003* (2013.01); *C10M 2203/1025* (2013.01); *C10M 2215/28* (2013.01); *C10M 2217/06* (2013.01); *C10N 2230/06* (2013.01); *C10N 2260/06* (2013.01)

(58) Field of Classification Search
CPC ........ C10M 2215/28; C10M 2207/282; C10M 2207/34
USPC ........................................ 508/288
See application file for complete search history.

(56) References Cited

U.S. PATENT DOCUMENTS

| 3,215,707 | A | 11/1965 | Rense |
| 3,219,666 | A | 11/1965 | Norman et al. |
| 3,231,587 | A | 1/1966 | Rense |
| 3,654,370 | A | 4/1972 | Yeakey |
| 3,832,402 | A | 8/1974 | Yeakey |
| 3,912,764 | A | 10/1975 | Palmer, Jr. |
| 4,033,888 | A | 7/1977 | Kiovsky |
| 4,330,471 | A | 5/1982 | Van der Voort |
| 4,462,918 | A | 7/1984 | Matthews et al. |
| 4,683,069 | A | 7/1987 | Brewster et al. |
| 4,943,672 | A | 7/1990 | Hamner |
| 4,957,651 | A | 9/1990 | Schwind |
| 4,958,536 | A | 9/1990 | Baumgarten |
| 4,990,476 | A | 2/1991 | Ward |
| 5,061,291 | A | 10/1991 | Sung |
| 5,114,603 | A | 5/1992 | Kennedy et al. |
| 5,498,809 | A | 3/1996 | Emert |
| 5,866,520 | A | 2/1999 | Addagarla et al. |
| 5,872,082 | A | 2/1999 | Watts |
| 5,882,505 | A | 3/1999 | Wittenbrink et al. |
| 5,885,942 | A | 3/1999 | Zhang et al. |
| 6,013,171 | A | 1/2000 | Cook |
| 6,080,301 | A | 6/2000 | Berlowitz |
| 6,096,940 | A | 8/2000 | Wittenbrink et al. |
| 6,103,099 | A | 8/2000 | Wittenbrink |
| 6,165,949 | A | 12/2000 | Berlowitz |
| 6,180,575 | B1 | 1/2001 | Nipe et al. |
| 7,696,136 | B2 | 4/2010 | Migdal et al. |
| 7,928,044 | B2 | 4/2011 | Stokes |
| 8,703,680 | B2 | 4/2014 | Suen |
| 9,228,152 | B2 | 1/2016 | Thompson et al. |
| 9,321,979 | B2 | 4/2016 | DeBlase et al. |
| 9,631,160 | B2 | 4/2017 | Burrington et al. |
| 2011/0028364 | A1 | 2/2011 | Shrestha et al. |
| 2012/0129743 | A1 | 5/2012 | Suen |
| 2013/0172220 | A1 | 7/2013 | Ruhe, Jr. et al. |
| 2014/0045734 | A1 | 2/2014 | Burrington et al. |
| 2014/0179571 | A1 | 6/2014 | Loper et al. |
| 2016/0024441 | A1 | 1/2016 | Cosgrove et al. |

FOREIGN PATENT DOCUMENTS

| EP | 0389273 A1 | 9/1990 |
| EP | 0884378 A2 | 12/1998 |
| GB | 1543359 A | 4/1979 |
| JP | 53050291 A | 5/1978 |
| JP | 53056610 A | 5/1978 |

(Continued)

OTHER PUBLICATIONS

Huntsman, "Jeffamine Polyetheramines" 2007, Date accessed: DB Apr. 2016 (Apr. 8, 2016), 1-16 http://www.huntsman.com/portal/page/portal/performance_products/Media%20Library/global/files/jeffamine_polyetheramines.pdf; p. 1-2.

*Primary Examiner* — Vishal V Vasisth

(74) *Attorney, Agent, or Firm* — Huntsman Petrochemical LLC; Edward Korompai

(57) ABSTRACT

The present disclosure relates to novel organic friction modifiers for use in non-aqueous lubricant compositions, the organic friction modifiers comprising a product formed from the reaction of polyisobutylene succinic anhydride and a hydrophilic polyetheramine.

16 Claims, No Drawings

(56) References Cited

FOREIGN PATENT DOCUMENTS

| | | | |
|---|---|---|---|
| JP | 56120679 | A | 9/1981 |
| JP | 58171488 | A | 10/1983 |
| WO | 2011107739 | A1 | 9/2011 |
| WO | 2012071185 | A2 | 5/2012 |
| WO | 2012162027 | A1 | 11/2012 |
| WO | 2012162282 | A1 | 11/2012 |
| WO | 2013176725 | A1 | 11/2013 |
| WO | 2014140550 | A1 | 9/2014 |

ORGANIC FRICTION MODIFIERS

CROSS-REFERENCE TO RELATED APPLICATIONS

This application is the National Phase of International Application PCT/US2016/020323 filed Mar. 2, 2016 which designated the U.S. and which claims priority to U.S. App. Ser. No. 62/128,092 filed Mar. 4, 2015. The noted applications are incorporated herein by reference.

STATEMENT REGARDING FEDERALLY SPONSORED RESEARCH OR DEVELOPMENT

Not applicable.

FIELD OF THE INVENTION

The present disclosure is directed to: a novel organic friction modifier; an additive package containing the organic friction modifier; a method for reducing the friction properties of a non-aqueous lubricant composition by adding the organic friction modifier to the non-aqueous lubricant composition; and, a method for reducing the friction between sliding parts of an engine by providing the non-aqueous lubricant composition containing the organic friction modifier to the engine.

BACKGROUND

To ensure smooth operation of engines, engine oils play an important role in lubricating a variety of sliding parts in the engine, for example, piston rings/cylinder liners, bearings of crankshafts and connecting rods, valve mechanisms including cams and valve lifters, and the like. Engine oils may also play a role in cooling the inside of an engine and dispersing combustion products. Further possible functions of engine oils may include preventing or reducing rust and corrosion.

The principal consideration for engine oils is to prevent wear and seizure of parts in the engine. Lubricated engine parts are mostly in a state of fluid lubrication, but valve systems and top and bottom dead centers of pistons are likely to be in a state of boundary and/or thin-film lubrication. The friction between these parts in the engine may cause significant energy losses and thereby reduce fuel efficiency.

In order to improve fuel efficiency, friction between engine parts must be reduced. Thin-film friction is the friction generated by a fluid, such as a lubricant, moving between two surfaces when the distance between the two surfaces is very small. It is known that some additives normally present in engine oils form films of different thicknesses which can have an effect on thin-film friction. Some additives, such as zinc dialkyl dithio phosphate (ZDDP), are known to increase thin-film friction. Though such additives may be required for other reasons, such as to protect engine parts, the increase in thin-film friction caused by such additives can be detrimental.

Both inorganic and organic friction modifiers have been utilized to help reduce thin-film friction and improve engine lubrication. For example:

U.S. Pat. Nos. 5,885,942, 5,866,520, 5,114,603, 4,957, 651 and 4,683,069 and published applications WO 2011/107739, US 2012/0129743 and US 2014/0179571 disclose glycerol monooleate (GMO) and its use as a friction modifier for lubricant compositions;

WO2013/176725 discloses metal based friction modifiers, such as organo molybdenum friction modifiers, blended with short chain alkyl esters of hydroxy carboxylic acids and their use in lubricant compositions;

WO2012/162282 discloses friction modifiers having one or more amide functional groups;

WO2012/162027 discloses an amine salt of a hydrocarbyl phosphate, a hydrocarbyl thiophosphate, a hydrocarbyl dithiophosphate, or combinations thereof and its use as a friction modifier;

WO2012/071185 discloses a friction modifier composition containing: a) an amino alcohol reaction product prepared by isomerizing a $C_{12}$-$C_{30}$ normal alpha olefin using at least one of a solid or liquid catalyst to form an internal olefin; epoxidizing said olefin; and reacting with an mono- or di-hydroxyl hydrocarbyl amine and b) an ester of glycerol and a $C_{12}$-$C_{22}$ carboxylic acid containing 0 to 3 double bonds;

EP0884378 discloses chain-hydrocarbon-group-substituted metal salicylates having friction reducing ability;

EP0389273 discloses a long chain succinimide derivative and a long chain amide described to have superior friction reducing properties; and US 2011/0028364 discloses alkenyl-substituted succinamide friction modifiers and their use in lubricant compositions to reduce friction.

Given the increasing fuel economy demands placed on engines, there remains a need to further improve the friction reduction and fuel economy of internal combustion engines utilizing lubricant compositions. It is therefore desirable to improve on the friction-reducing performance of known friction modifiers, such as glycerol monooleate, that have been commonly used in the art.

SUMMARY

The present disclosure relates to an organic friction modifier comprising a product formed from the reaction of polyisobutylene succinic anhydride and a hydrophilic polyetheramine. Also provided is an additive package comprising the organic friction modifier of the present disclosure and one or more additives.

The friction modifier may also be combined with a base oil to form a non-aqueous lubricant composition for use in lubricating an engine. Thus, in another embodiment, this disclosure provides a method for reducing the friction properties of a non-aqueous lubricant composition by adding the organic friction modifier to the non-aqueous lubricant composition. Also provided is a method for reducing friction between sliding parts of an engine by contacting at least one of the sliding parts with the non-aqueous lubricant composition.

DETAILED DESCRIPTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article.

The term "alkyl" refers to a group derived from an aliphatic hydrocarbon and includes a linear, branched or a cyclic group, which may be substituted or unsubstituted.

The term "hydroxyl" refers to an —OH group.

The phrases "in one embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The present disclosure generally provides novel organic friction modifiers, additive packages including such organic friction modifiers, non-aqueous lubricant compositions containing a base oil and such organic friction modifiers, a method for modifying the friction properties of the non-aqueous lubricant composition by adding the organic friction modifier to the composition and a method for reducing the friction in an engine by providing the non-aqueous lubricant composition to sliding parts of the engine. It has been surprisingly discovered that the non-aqueous lubricant composition containing the organic friction modifiers of the present disclosure exhibit significantly lower boundary and/or thin film friction properties than non-aqueous lubricant compositions that do not contain the organic friction modifiers of the present disclosure. Therefore, the organic friction modifiers of the present disclosure, when added to a non-aqueous lubricant composition and provided to sliding parts of an engine, will provide an improvement in friction reduction and fuel economy for the engine.

According to one embodiment, the organic friction modifier of the present disclosure is a product formed from the reaction of polyisobutylene succinic anhydride and a hydrophilic polyetheramine.

Polyisobutylene succinic anhydrides of the present disclosure are well known in the art and may be prepared by several known methods which generally include the reaction of polyisobutene and maleic acid, maleic anhydride or mixtures thereof (hereinafter referred to as a "maleic reactant"). According to one embodiment, one method for preparing the polyisobutylene succinic anhydride is illustrated, in part, in U.S. Pat. No. 3,219,666 which is expressly incorporated herein by reference for its teachings in regard to preparing polyisobutylene succinic anhydrides. This method is conveniently designated as the "two-step procedure." It involves first chlorinating the polyisobutene until there is an average of at least about one chloro group for each molecular weight of polyisobutene. Chlorination involves contacting the polyisobutene with chlorine gas until the desired amount of chlorine is incorporated into the chlorinated polyisobutene. Chlorination is generally carried out at a temperature of about 75° C. to about 125° C. If a diluent is used in the chlorination procedure, it should be one which is not itself readily subject to further chlorination. Poly- and perchlorinated and/or fluorinated alkanes and benzenes are examples of suitable diluents. The second step in the two-step chlorination procedure, is to react the chlorinated polyisobutene with the maleic reactant at a temperature usually within the range of about 100° C. to about 200° C. The mole ratio of chlorinated polyisobutene to maleic reactant is usually about 1:1. However, a stoichiometric excess of maleic reactant can be used, for example, a mole ratio of chlorinated polyisobutene to maleic reactant of about 1:2. If an average of more than about one chloro group per molecule of polyisobutene is introduced during the chlorination step, then more than one mole of maleic reactant can react per molecule of chlorinated polyisobutene. Because of such situations, it is better to describe the ratio of chlorinated polyalkene to maleic reactant in terms of equivalents. (An equivalent weight of chlorinated polyisobutene is the weight corresponding to the number average molecular weight divided by the average number of chloro groups per molecule of chlorinated polyisobutene while the equivalent weight of a maleic reactant is its molecular weight.). Thus, the ratio of chlorinated polyisobutene to maleic reactant will normally be such as to provide about one equivalent of maleic reactant for each mole of chlorinated polyisobutene up to about one equivalent of maleic reactant for each equivalent of chlorinated polyalkene with the understanding that it is normally desirable to provide an excess of maleic reactant; for example, an excess of about 5% to about 25% by weight. Unreacted excess maleic reactant may be stripped from the reaction product, usually under vacuum.

Another method for preparing polyisobutylene succinic anhydrides utilizes a process described in U.S. Pat. No. 3,912,764 and U.K. Pat. No. 1,440,219, both of which are expressly incorporated herein by reference for their teachings in regard to that process. According to this process, the polyisobutene and the maleic reactant are first reacted by heating them together in a "direct alkylation" procedure. When the direct alkylation step is completed, chlorine is introduced into the reaction mixture to promote reaction of the remaining unreacted maleic reactants. 0.3 moles to 2 or more moles of maleic reactant are used in the reaction for each mole of polyisobutene. The direct alkylation step may be conducted at temperatures of about 180° C. to about 250° C. During the chlorine-introducing stage, a temperature of about 160° C. to about 225° C. may be employed.

A further method for preparing polyisobutylene succinic anhydrides is called a "one-step process." This process is described in U.S. Pat. Nos. 3,215,707 and 3,231,587, both of which are expressly incorporated herein by reference for their teachings in regard to this process. The one-step process involves preparing a mixture of the polyisobutene and maleic reactant containing the necessary amounts of both to provide the desired polyisobutylene succinic anhydride, and in most embodiments, this means that there must be at least 1.3 moles of maleic reactant for each mole of polyisobutene. Chlorine is then introduced into the mixture, usually by passing chlorine gas through the mixture with agitation, while maintaining a temperature of at least about 140° C. Usually, where the polyisobutene is sufficiently fluid at 140° C. and above, there is no need to utilize an additional substantially inert, normally liquid solvent/diluent in the one-step process. However, as explained hereinbefore, if a solvent/diluent is employed, it may be one that resists chlorination. Again, the poly- and per-chlorinated and/or -fluorinated alkanes, cycloalkanes, and benzenes can be used for this purpose.

Chlorine may be introduced continuously or intermittently during the one-step process. The rate of introduction of the chlorine is not critical although, for maximum utilization of the chlorine, the rate should be about the same as the rate of consumption of chlorine in the course of the reaction. When the introduction rate of chlorine exceeds the rate of consumption, chlorine is evolved from the reaction mixture. It is often advantageous to use a closed system, including super atmospheric pressure, in order to prevent loss of chlorine so as to maximize chlorine utilization. The minimum temperature at which the reaction in the one-step process takes place at a reasonable rate is about 140° C. Thus, the minimum temperature at which the process is normally carried out is in the neighborhood of about 140° C. In one embodiment, the temperature range may be between about 160° C. and about 220° C. Higher temperatures such as 250° C. or even higher may be used but usually with little advantage. In fact, temperatures in excess of 220° C. are often disadvantageous because they tend to "crack" the polyisobutene (that is, reduce their molecular weight by thermal degradation) and/or decompose the maleic reactant. For this reason, maximum temperatures of about 200° C. to about 210° C. are normally not exceeded.

In one particular embodiment, a low chlorine containing polyisobutylene succinic anhydride may be produced using a polyisobutene having at least 45 mole percent, and in other embodiments at least 70 mole percent, and in further embodiments at least 80 mole percent vinylidene terminal units which allow the polyisobutene to more readily react with the maleic reactant and reduce or eliminate the amount of chlorine necessary during reaction. Examples of these types of polyisobutenes include Glissopal® 1000 polyisobutene available from BASF and TPC 595 available from Texas Petroleum Company. Further examples of these types of polyisobutenes are given in U.S. Pat. No. 5,241,003 and in column 2, in U.S. Pat. No. 4,152,499, the contents of which are hereby incorporated by reference. According to another embodiment, the polyisobutene may have a number average molecular weight of about 500 to about 5000.

In some embodiments, the maleic reactant used in preparing the polyisobutylene succinic anhydride may contain small portions of impurities but it is preferred that it is pure to avoid adding color bodies to the polyisobutylene succinic anhydride. As noted above, the mole ratio of maleic reactant to polyisobutene can vary widely. For example, the mole ratio of maleic reactant to polyisobutene may vary from 10:1 to 1:5, with some embodiments ranging from a mole ratio of maleic reactant to polyisobutene of 1:1 to 6:1. In most embodiments, the maleic reactant is used in stoichiometric excess, for example, 1.1 to 3 moles maleic reactant per mole of polyisobutene. The unreacted maleic reactant can be vaporized from the resultant reaction mixture.

The hydrophilic polyetheramine may be a mono-, di-, tri-, tetra- or multifunctional polyetheramine. Methods for preparing hydrophilic polyetheramines are well known and can be found at, for example, U.S. Pat. Nos. 3,654,370, 3,832, 402 and 4,990,476, the contents of which are incorporated herein by reference. In general, these hydrophilic polyetheramines may be produced by alkoxylating a mono-, di-, tri-, tetra- or multifunctional alcohol or alkyl phenol with an alkylene oxide, such as ethylene oxide, propylene oxide, butylene oxide or mixtures thereof, to form an alkylene oxide adduct, and then catalytically aminating the alkylene oxide adduct in the presence of hydrogen and ammonia to form the polyetheramine. In some embodiments, the hydrophilic polyetheramine may be initialized by an amine which is alkoxylated and then aminated.

According to one embodiment, the hydrophilic polyetheramine is a polyether monoamine having the formula (1) or (1a):

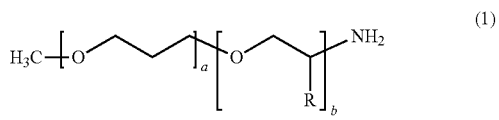

where R is hydrogen or methyl, and
a and b independently are integers from about 1 to about 150;

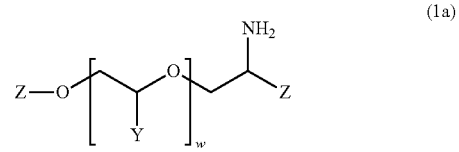

where Y is hydrogen or methyl,
Z is a $C_1$-$C_{40}$ alkyl group or a $C_1$-$C_{40}$ alkyl phenol group and
w is an integer from about 1 to about 100.

In another embodiment, the hydrophilic polyetheramine is a polyether monoamine having the formula (2) or (2a):

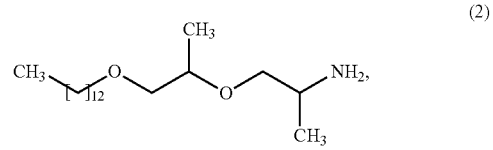

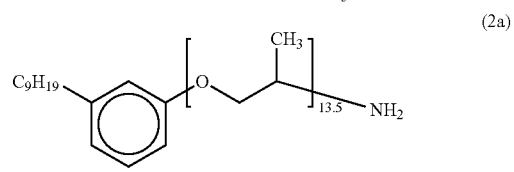

Commercially available polyether monoamines include the JEFFAMINE® M-series and XTJ-series amines, including, but not limited to, JEFFAMINE® M-600, M-1000, M-2005, M-2070, XTJ-435 and XTJ-436 amines, available from Huntsman Corporation.

In another embodiment, the hydrophilic polyetheramine is a polyether diamine having the formula (3), (4) or (5):

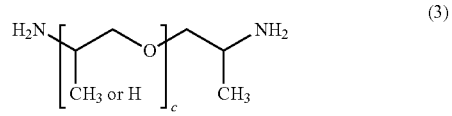

where c is an integer from about 2 to about 100;

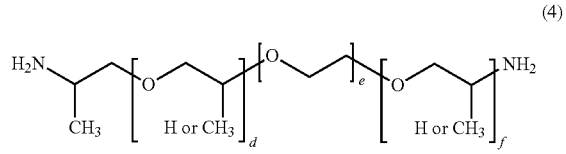

where e is an integer from about 2 to about 40, and
d and f independently are integers from about 1 to about 10;

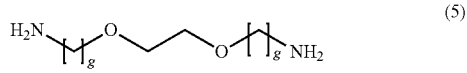

where g is an integer from about 2 to about 3.

Commercially available polyether diamines include the JEFFAMINE® D, ED and EDR amines, including, but not limited to, JEFFAMINE® D-200, D-400, D-2000, D-4000, ED-600, ED-900, ED-20003, EDR-148 and EDR-176 amines, available from Huntsman Corporation.

In yet another embodiment, the hydrophilic polyetheramine is a polyether triamine having the formula (6):

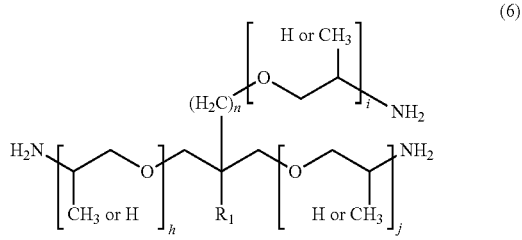

where $R_1$ is hydrogen, methyl or ethyl,
n is an integer of 0 or 1, and
h, i and j independently are integers from about 1 to about 100.

Commercially available triamines include the JEFFAMINE® T-series amines, including, but not limited to, JEFFAMINE® T-403, T-3000 and T-5000 amines, available from Huntsman Corporation.

In still another embodiment, the hydrophilic polyetheramine is a polyether tetraamine having the formula:

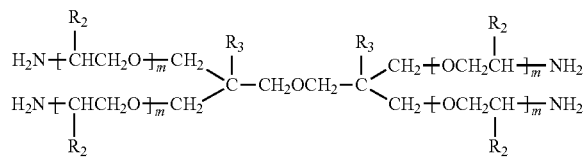

where each $R_2$ is independently hydrogen, methyl or ethyl, $R_3$ is a $C_1$-$C_5$ alkyl group, and
each M independently is an integer from about 2 to about 50.

In still another embodiment, the hydrophilic polyetheramine is a multifunctional polyetheramine. The multifunctional polyetheramine of the present disclosure may be a polyether di-, tri or tetraamine, such as those described herein, having at least one of the hydrogens of the amine groups replaced by a hydroxyl group. For example, the multifunctional polyetheramine may have the formula (8):

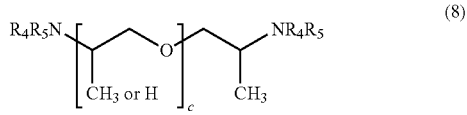

where each $R_4$ and $R_5$ are independently hydrogen or a hydroxyl group, with the proviso that at least one of $R_4$ is a hydrogen and at least one of $R_5$ is a hydroxyl group.

In a further embodiment, the hydrophilic polyetheramine may be an oligomer of the polyetheramines described herein, and which are formed by the removal of ammonia between two or more polyetheramines. For example, the oligomer could be a dimer of the polyetheramine monoamine of formula (1a):

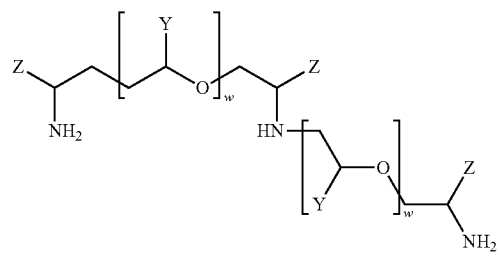

where Y, Z and w are defined above.

In one embodiment, the novel organic friction modifiers of the present disclosure are formed by reacting the polyisobutylene succinic anhydride with the hydrophilic polyetheramine under suitable reaction conditions to form the organic friction modifier. The reaction conditions may be those described in, for example, U.S. Pat. No. 3,219,666 or 3,272,746, the contents of which are incorporated by reference. In one particular embodiment, the polyisobutylene succinic anhydride is provided in a reaction vessel under an inert atmosphere, such as nitrogen or argon. The polyisobutylene succinic anhydride is then heated to an elevated temperature above room temperature, for example, from about 70° C. to about 190° C. The hydrophilic polyamine is then added to the reaction vessel while maintaining an inert atmosphere. The molar ratio of polyisobutylene succinic anhydride to amino groups in the polyetheramine may range from about 0.5:1 to about 10:1 and in some embodiments from about 1:1 to about 6:1. After combining the polyetheramine and succinic anhydride, the reactants are stirred at a temperature ranging from about 70° C. to about 190° C. for a period of time sufficient to substantially react all of the reactants, for example, from about 1 hour to about 10 hours or longer. The reaction product may then optionally be diluted with a process oil, cooled to room temperature and filtered.

Thus in one embodiment, the polyisobutylene succinic anhydride is reacted with a hydrophilic polyetheramine under suitable reaction conditions to form an organic friction modifier as follows:

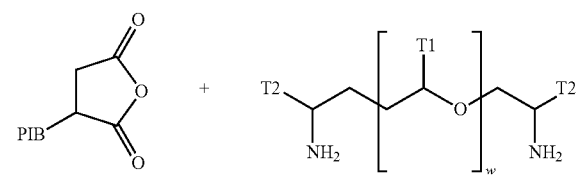

-continued

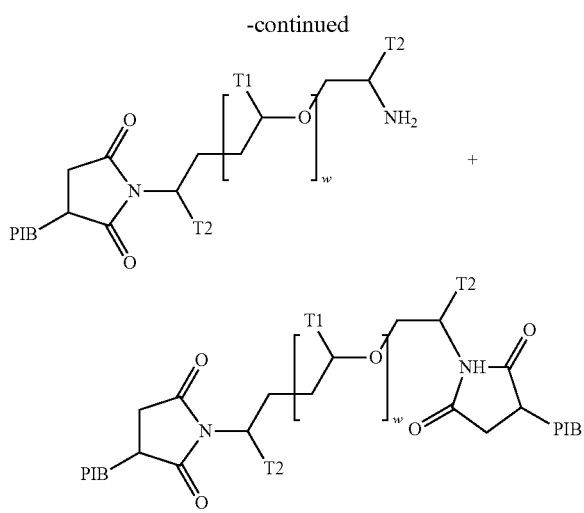

where w is an integer from about 1 to 100, PIB is polyisobutenyl and T1 and T2 in each instance are each independently hydrogen, methyl or ethyl.

The present disclosure also provides a non-aqueous lubricant composition containing a base oil and the organic friction modifier of the present disclosure. According to one embodiment, the total amount of base oil incorporated in the non-aqueous lubricant composition of the present disclosure is in an amount in the range of from about 50 wt. % to about 99 wt. %, and in other embodiments from about 60 wt. % to about 92 wt. %, in still other embodiments from about 70 wt. % to about 90 wt. %, and in further embodiments from about 75 wt. % to about 88 wt. %, with respect to the total weight of the non-aqueous lubricant composition. In another embodiment, the total amount of the organic friction modifier incorporated in the non-aqueous lubricant composition of the present disclosure is in an amount in the range of from about 0.0001 wt. % to about 20 wt. %, and in other embodiments from about 0.001 wt. % to about 10 wt. %, in still other embodiments from about 0.01 wt. % to about 5 wt. %, and in further embodiments from about 0.1 wt. % to about 3 wt. %, with respect to the total weight of the non-aqueous lubricant composition.

There are no particular limitations regarding the base oil that may be used in the present disclosure, and various conventional known synthetic oils and mineral oils and mixtures thereof may be conveniently used.

Examples of synthetic oils include alkyl esters of dicarboxylic acids, polyglycols and alcohols, poly-alpha-olefins, including polybutenes, alkyl benzenes, organic esters of phosphoric acids, and polysilicone oils. Synthetic oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, di-nonylbenzenes, di-(2-ethylhexyl)benzenes, etc.); polyphenyls (e.g., biphenyls, terphenyl, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic oils that may be used. Such oils are exemplified by the oils prepared through polymerization of ethylene oxide or propylene oxide, the alkyl and aryl ethers of these polyoxyalkylene polymers (e.g., methyl-polyisopropylene glycol ether having an average molecular weight of about 1000, diphenyl ether of polyethylene glycol having a molecular weight of about 500-1000, diethyl ether of polypropylene glycol having a molecular weight of about 1000-1500, etc.) or mono- and polycarboxylic esters thereof, for example, the acetic acid esters, mixed $C_3$-$C_8$ fatty acid esters, or the $C_{13}$ oxo-acid diester of tetraethylene glycol.

Another class of synthetic oils that may be used includes the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

The base oil may contain a minor or major amount of a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. PAOs may have a viscosity of from about 2 to about 15 cSt, or from about 3 to about 12 cSt, or from about 4 to about 8 cSt, at 100° C. Examples of PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

The base oil may be an oil derived from Fischer-Tropsch synthesized hydrocarbons. Fischer-Tropsch synthesized hydrocarbons are made from synthesis gas containing $H_2$ and CO using a Fischer-Tropsch catalyst. Such hydrocarbons typically require further processing in order to be useful as the base oil. For example, the hydrocarbons may be hydroisomerized using processes disclosed in U.S. Pat. No. 6,103,099 or 6,180,575; hydrocracked and hydroisomerized using processes disclosed in U.S. Pat. No. 4,943,672 or 6,096,940; dewaxed using processes disclosed in U.S. Pat. No. 5,882,505; or hydroisomerized and dewaxed using processes disclosed in U.S. Pat. No. 6,013,171; 6,080,301; or 6,165,949.

Unrefined, refined, and rerefined oils, either mineral or synthetic (as well as mixtures of two or more of any of these) of the type disclosed herein can be used in the base oils. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives, contaminants, and oil breakdown products.

Mineral oils include liquid petroleum oils and solvent-treated or acid-treated mineral lubricating oil of the paraffinic, naphthenic, or mixed paraffinic/naphthenic type which may be further refined by hydrofinishing processes and/or dewaxing.

Naphthenic base oils have low viscosity index (VI) (generally 40-80) and a low pour point. Such base oils are produced from feedstock rich in naphthene and low in wax content and are used mainly for lubricants in which color and color stability are important, and VI and oxidation stability are of secondary importance.

Paraffinic base oils have higher VI (generally >95) and a high pour point. These base oils are produced from feedstock rich in paraffin, and are used for lubricants in which VI and oxidation stability are important.

In some embodiments, the base oil is constituted from mineral oils and/or synthetic oils containing more than 80 wt. % of saturates, and in other embodiments more than 90 wt. %, as measured according to ASTM D2007. In other embodiments, the base oil contains less than 1.0 wt. %, and in still other embodiments less than 0.1 wt. % of sulphur, calculated as elemental sulphur and measured according to ASTM D2622, ASTM D4294, ASTM D4927 or ASTM D3120.

As one skilled in the art would readily appreciate, the viscosity of the base oil is dependent upon the application. Accordingly, the viscosity of a base oil for use herein may ordinarily range from about 2 cSt to about 2000 cSt at 100° C. Generally, individually the base oils used as engine oils will have a kinematic viscosity range at 100° C. of about 2 cSt to about 30 cSt, in some embodiments about 3 cSt to about 16 cSt, and other embodiments about 4 cSt to about 12 cSt and will be selected or blended depending on the desired end use and the additives in the finished oil to give the desired grade of engine oil, e.g., a lubricant composition having an SAE Viscosity Grade of 0W, 0W-20, 0W-30, 0W-40, 0W-50, 0W-60, 5W, 5W-20, 5W-30, 5W-40, 5W-50, 5W-60, 10W, 1 0W-20, 10W-30, 1 0W-40, 1 0W-50, 15W, 15W-20, 15W-30 or 15W-40. Base oils used as gear oils may have viscosities ranging from about 2 cSt to about 2000 cSt at 100° C.

The non-aqueous lubricant compositions may be used in the lubrication of essentially any spark-ignited or compression-ignited internal composition engine, including automobile and truck engines, two cycle engines, diesel engines, aviation piston engines, marine and railroad engines and the like. Also contemplated are non-aqueous lubricant compositions for gas fired engines, alcohol (e.g. methanol) powered engines, stationary powered engines, turbines and the like. The non-aqueous lubricant composition may also be used as an automatic transmission fluid, gear lubricant, compressor lubricant, metal-working lubricant, or hydraulic fluid.

The non-aqueous lubricant composition may further comprise additional additives such as anti-oxidants, anti-wear additives, detergents, dispersants, other friction modifiers, viscosity index improvers, pour point depressants, corrosion inhibitors, defoaming agents and seal fix or seal compatibility agents and mixtures thereof. A sampling of these additives can be found in, for example, U.S. Pat. Nos. 5,498,809 and 7,696,136, the relevant portions of each disclosure is incorporated herein by reference, although one skilled in the art is well aware that this comprises only a partial list of available lubricant additives. It is also well known that one additive may be capable of providing or improving more than one property, e.g., an anti-wear agent may also function as an anti-fatigue and/or an extreme pressure additive.

Antioxidants that may be conveniently used include those selected from the group of aminic antioxidants and/or phenolic antioxidants. In one embodiment, the antioxidants are present in an amount in the range of from 0.1 wt. % to about 5.0 wt. %, while in other embodiments from an amount in the range of from 0.3 to about 3.0 wt. %, based on the total weight of the non-aqueous lubricant composition.

Examples of aminic antioxidants which may be conveniently used include alkylated diphenylamines, phenyl-α-naphthylamines, phenyl-β-naphthylamines and alkylated α-naphthylamines.

In one embodiment, the aminic antioxidants include dialkyldiphenylamines such as p,p'-dioctyl-diphenylamine, p,p'-di-α-methylbenzyl-diphenylamine and N-p-butylphenyl-N-p'-octylphenylamine, monoalkyldiphenylamines such as mono-t-butyldiphenylamine and mono-octyldiphenylamine, bis(dialkylphenyl)amines such as di-(2,4-diethylphenyl) amine and di(2-ethyl-4-nonylphenyl)amine, alkylphenyl-1-naphthylamines such as octylphenyl-1-naphthylamine and n-t-dodecylphenyl-1-naphthylamine, 1-naphthylamine, aryl-naphthylamines such as phenyl-1-naphthylamine, phenyl-2-naphthylamine, N-hexylphenyl-2-naphthylamine and N-octylphenyl-2-naphthylamine, phenylenediamines such as N,N'-diisopropyl-p-phenylenediamine and N,N'-diphenyl-p-phenylenediamine, and phenothiazines such as phenothiazine and 3,7-dioctylphenothiazine.

Examples of phenolic antioxidants which may be conveniently used include $C_7$-$C_9$ branched alkyl esters of 3,5-bis (1,1-dimethyl-ethyl)-4-hydroxy-benzenepropanoic acid, 2-t-butylphenol, 2-t-butyl-4-methylphenol, 2-t-butyl-5-methylphenol, 2,4-di-t-butylphenol, 2,4-dimethyl-6-t-butylphenol, 2-t-butyl-4-methoxyphenol, 3-t-butyl-4-methoxyphenol, 2,5-di-t-butylhydroquinone, 2,6-di-t-butyl-4-alkylphenols such as 2,6-di-t-butylphenol, 2,6-di-t-butyl-4-methylphenol and 2,6-di-t-butyl-4-ethylphenol, 2,6-di-t-butyl-4-alkoxyphenols such as 2,6-di-t-butyl-4-methoxyphenol and 2,6-di-t-butyl-4-ethoxyphenol, 3,5-di-t-butyl-4-hydroxybenzylmercaptooctylacetate, alkyl-3-(3,5-di-t-butyl-A-hydroxyphenyl)propionates such as n-octadecyl-3-(3,5-di-t-butyl-4-hydroxyphenyl)propionate, n-butyl-3-(3,5-di-t-butyl-4-hydroxyphenyl)propionate and 2'-ethylhexyl-3-(3,5-di-t-butyl-4-hydroxyphenyl)propionate, 2,6-d-t-butyl-α-dimethylamino-p-cresol, 2,2'-methylenebis(4-alkyl-6-t-butylphenol) such as 2,2'-methylenebis (4-methyl-6-t-butylphenol, and 2,2-methylenebis(4-ethyl-6-t-butylphenol), bisphenols such as 4,4'-butylidenebis(3-methyl-6-t-butylphenol, 4,4'-methylenebis(2,6-di-t-butylphenol), 4,4'-bis(2,6-di-t-butylphenol), 2,2-(di-p-hydroxyphenyl)propane, 2,2-bis(3,5-di-t-butyl-4-hydroxyphenyl)propane, 4,4'-cyclohexylidenebis(2,6-t-butylphenol), hexamethyleneglycol-bis[3-(3,5-di-t-butyl-4-hydroxyphenyl)propionate], triethyleneglycolbis[3-(3-t-butyl-4-hydroxy-5-methylphenyl)propionate], 2,2'-thio-[diethyl-3-(3,5-di-t-butyl-4-hydroxyphenyl)propionate], 3,9-bis{1,1-dimethyl-2-[3-(3-t-butyl-4-hydroxy-5-methylphenyl)-propionyloxy]ethyl}2,4,8,10-tetraoxaspiro[5,5]undecane, 4,4'-thiobis(3-methyl-6-t-butylphenol) and 2,21-thiobis(4,6-di-t-butylresorcinol), polyphenols such as tetrakis[methylene-3-(3,5-di-t-butyl-4-hydroxyphenyl)propionate]methane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis-[3,3'-bis(4'-hydroxy-3'-t-butylphenyl)butyric acid]glycol ester, 2-(3',5'-di-t-butyl-4-hydroxyphenyl)methyl-4-(2'',4''-di-t-butyl-3''-hydroxyphenyl)methyl-6-t-butylphenol and 2,6-bis(2'-hydroxy-3'-t-butyl-5'-methylbenzyl)-4-methylphenol, and p-t-butylphenol-formaldehyde condensates and p-t-butylphenol-acetaldehyde condensates.

In another embodiment, the non-aqueous lubricant composition may comprise a single zinc dithiophosphate or a combination of two or more zinc dithiophosphates as anti-wear additives, each zinc dithiophosphate being selected from zinc diallyl-, diaryl- or alkylaryl-dithiophosphates. The non-aqueous lubricant composition may generally comprise in the range of from about 0.4 wt. % to about 1.0 wt. % of zinc dithiophosphate, based on total weight of the non-aqueous lubricant composition. Additional or alternative known anti-wear additives may also be conveniently used in the non-aqueous lubricant composition.

Typical detergents that may be used in the non-aqueous lubricant composition include one or more salicylate and/or phenate and/or sulphonate detergents. However, as metal organic and inorganic base salts that are used as detergents can contribute to the sulphated ash content of a non-aqueous lubricant composition, in one embodiment the amounts of such additives are minimized. Furthermore, in order to maintain a low sulphur level, salicylate detergents are preferred. Thus, in one embodiment, the non-aqueous lubricant composition may comprise one or more salicylate detergents. The detergents may be used in amounts in the range of about 0.05 wt. % to about 12.5 wt. %, in some embodiments from about 1.0 wt. % to about 9.0 wt. % and in other embodiments in the range of from about 2.0 wt. % to about 5.0 wt. %, based on the total weight of the non-aqueous lubricant composition.

Additional friction modifiers which may be used include metal based friction modifiers comprising one or more organo molybdenum compounds such as, for example, molybdenum dialkyldithiocarbamates, molybdenum diallyl dithiophosphates, molybdenum disulfide, tri-molybdenum cluster dialkyldithiocarbamates, non-sulfur molybdenum compounds and the like; for example, a molybdenum dialkyldithiocarbamate friction modifier may be present. Many of these molybdenum compounds are well known and many are commercially available. Other friction modifiers that may also be present, include organic fatty acids and derivatives of organic fatty acids, amides, imides, and other organo metallic species for example zinc and boron compounds, etc. The amounts of these other friction modifiers that may be added to the non-aqueous lubricant composition may range from about 0.001 wt. % to about 5 wt. % based on the total weight of the non-aqueous lubricant composition.

The non-aqueous lubricant compositions of the present disclosure may additionally contain an ash-free dispersant which may be admixed in an amount in the range of from 5 wt. % to about 15 wt. %, based on the total weight of the non-aqueous lubricant composition.

Examples of ash-free dispersants which may be used include the polyalkenyl succinimides and polyalkenyl succinic acid esters disclosed in Japanese Laid-Open Patent Application Nos. JP 53-050291 A, JP 56-120679 A, JP 53-056610 A and JP 58-171488 A. In one embodiment, the dispersant includes borated succinimides.

Examples of viscosity index improvers which may conveniently be used in the non-aqueous lubricant composition of the present disclosure include the styrene-butadiene copolymers, styrene-isoprene stellate copolymers and the polymethacrylate copolymer and ethylene-propylene copolymers. Such viscosity index improvers may be conveniently employed in an amount in the range of from about 1 wt. % to about 20 wt. %, based on the total weight of the non-aqueous lubricant composition.

Polymethacrylates may be conveniently employed in the non-aqueous lubricant compositions of the present invention as effective pour point depressants.

Furthermore, compounds such as alkenyl succinic acid or ester moieties thereof, benzotriazole-based compounds and thiodiazole-based compounds may be conveniently used in the non-aqueous lubricant composition of the present disclosure as corrosion inhibitors.

Compounds such as polysiloxanes, dimethyl polycyclohexane and polyacrylates may be conveniently used in the non-aqueous lubricant composition of the present disclosure as defoaming agents.

Compounds which may be conveniently used in the non-aqueous lubricant composition of the present disclosure as seal fix or seal compatibility agents include, for example, commercially available aromatic esters.

As noted above, the non-aqueous lubricant compositions may contain any number of these additives. Thus, in some embodiments, final non-aqueous lubricant compositions of this disclosure will generally contain a combination of additives, including the novel organic friction modifiers along with other common additives, in a combined concentration ranging from 0.1 wt. % to 30 wt. %, for example, from about 0.5 wt. % to 10 wt. % based on the total weight of the non-aqueous lubricant composition. In other embodiments, the combined additives are present from about 1 wt. % to 5 wt. % based on the total weight of the non-aqueous lubricant composition. Oil concentrates of the additives can contain from 30 wt. % to 75 wt. % additives, based on the total weight of the non-aqueous lubricant composition.

According to another embodiment, there is provided a non-aqueous lubricant composition comprising:
A) from 70 to 99.9 wt. % of a base oil, based on the total weight of the non-aqueous lubricant composition;
B) the organic friction modifier of the present disclosure; and
C) one or more additional additives.
wherein the combined amount of B) and C) present in the composition is from 0.1 to 30 weight percent based on the total weight of the non-aqueous lubricant composition.

In another embodiment the base oil is present in an amount from 90 wt. % to 99.5 wt. % and the combined amount of B) and C) is from 0.5 wt. % to 10 wt. %; and in another embodiment the base oil is present in an amount from 95 wt. % to 99 wt. % and the combined amount of B) and C) is from 1 wt. % to 5 wt. % based on the total weight of the non-aqueous lubricant composition.

The organic friction modifier can be added directly to base oil by itself or in combination with one or more additives. Thus, in one embodiment, there is provided an additive package comprising the organic friction modifier of the present disclosure and one or more additives. It is also possible to add the organic friction modifier to a preformulated non-aqueous lubricant composition which already contains all or most of the other formulation components and additives.

Because of the surprisingly improved friction reducing properties exhibited by the organic friction modifiers of the present disclosure, the non-aqueous lubricant compositions of this disclosure can be can be employed to improve fuel economy for gas and diesel engines. There is also provided a method for improving the friction reducing properties of a non-aqueous lubricant composition by adding the organic friction modifier to the non-aqueous lubricant and, correspondingly, a method for reducing friction between sliding parts of an engine by providing the non-aqueous lubricant composition of the present disclosure to the engine. In some embodiments, the sliding parts may be piston rings/cylinder liners, bearings of crankshafts and connecting rods and valve mechanisms including cams and valve lifters.

EXAMPLES

Example 1. Making Friction Modifier A ("FM A")

One mole of ethylene glycol was reacted with 8 mole ethylene oxide followed by 3.6 mole propylene oxide with KOH as the catalyst at 120° C. to make a polyol. The polyol was then treated with MAGNESOL® adsorbent (a synthetic magnesium silicate commercially available from the Dallas Group of America, Inc. located in Whitehouse, N.J.) at 90° C. and the solids were filtrated off to remove the KOH catalyst. The above polyol was then passed through a fixed bed reactor installed with a metal amination catalyst. Ammonia and hydrogen were co-fed into the reactor at 2000 psi and 200° C. After removing residual ammonia and water, the product produced was a polyether diamine with amine value of around 3.2 meq/g. 58 g of the above polyether diamine was then reacted with 122 g polyisobutylene succinic anhydride at 180° C. for 2 hours with continuous removal of water. The polyisobutylene succinic anhydride reactant had a M.W. of around 1000 and an acid number of 92 mgKOH/g. The organic friction modifier, FM A, that was produced was a dark liquid.

Example 2. Making Friction Modifier B ("FM B")

One mole ethylene glycol was reacted with 11.5 mole ethylene oxide followed by 6 mole propylene oxide with KOH as the catalyst at 120° C. to make a polyol. The polyol was then treated with MAGNESOL® absorbent at 90° C. and the solids were filtrated off to remove the KOH catalyst. The above polyol was then passed through a fixed bed reactor installed with a metal amination catalyst. Ammonia and hydrogen were co-fed into the reactor at 2000 psi and 200° C. After removing residual ammonia and water, the product produced was a polyether diamine with amine value of around 2.25 meq/g. 84 g of the above polyether diamine was reacted with 122 g polyisobutylene succinic anhydride at 180° C. for 2 hours with continuous removal of water. The polyisobutylene succinic anhydride reactant used had a M.W. of around 1000 and acid number of 92 mgKOH/g. The organic friction modifier, FM B, which was produced was a dark liquid.

Example 3. Making Friction Modifier C ("FM C")

A triethylene glycol liquid was passed through a fixed bed reactor installed with a metal amination catalyst. Ammonia and hydrogen were co-fed into the reactor at 2000 psi and 200° C. After removing residual ammonia and water, the product produced was a polyether amine with an amine value of around 10.3 meq/g. 28.4 g of the above polyether amine dimer was reacted with 122 g polyisobutylene succinic anhydride at 180° C. for 2 hours with continuous removal of water. The polyisobutylene succinic anhydride used had M.W. of around 1000 and an acid number of 92 mgKOH/g. The organic modifier produced was further treated with 7.8 g ethylene carbonate at 100° C. The resulting organic friction modifier, FM C, was a dark liquid.

Example 4. Making Friction Modifier D ("FM D")

One mole ISOFOL® 20 alcohol (an octyldodecanol commercially available from SASOL CHEMICALS (USA) LLC located in Houston, Tex.) was reacted with 22 mole ethylene oxide followed by 3 mole propylene oxide with KOH as the catalyst at 120° C. to make a polyol. The polyol was then treated with MAGNESOL® absorbent at 90° C. and the solids were filtrated off to remove the KOH catalyst. The above polyol was then passed through a fixed bed reactor installed with a metal amination catalyst. Ammonia and hydrogen were co-fed into the reactor at 2000 psi and 200° C. After removing residual ammonia and water, the product produced was a polyether monoamine with amine value of around 0.514 meq/g. 146.5 g of the above polyether diamine was reacted with 146.4 g polyisobutylene succinic anhydride at 180° C. for 2 hours with continuous removal of water. The polyisobutylene succinic anhydride reactant used had a M.W. of around 1000 and acid number of 92 mgKOH/g. The organic friction modifier, FM D, which was produced was a dark liquid.

Example 5. Making Friction Modifier E ("FM E")

One mole trimethylolpropane (TMP) was reacted with 30 mole ethylene oxide followed by 9 mole propylene oxide with KOH as the catalyst at 120° C. to make a polyol. The polyol was then treated with MAGNESOL® absorbent at 90° C. and the solids were filtrated off to remove the KOH catalyst. The above polyol was then passed through a fixed bed reactor installed with a metal amination catalyst. Ammonia and hydrogen were co-fed into the reactor at 2000 psi and 200° C. After removing residual ammonia and water, the product produced was a polyether monoamine with amine value of around 1.3926 meq/g. 719.6 g of the above polyether diamine was reacted with 1220 g polyisobutylene succinic anhydride at 180° C. for 2 hours with continuous removal of water. The polyisobutylene succinic anhydride reactant used had a M.W. of around 1000 and acid number of 92 mgKOH/g. The organic friction modifier, FM E, which was produced was a dark liquid.

Example 6. Evaluation of Friction Modifiers

The coefficient of friction (i.e. a measurement of friction between pairs of surfaces where a low coefficient of friction for a pair of surfaces means they can move easily over each other and a high coefficient of friction means they cannot move easily over each other) of Group II Shell Catenex Oil T 121 base fluid (commercially available from Royal Dutch Shell, based in The Hague, Netherlands) and further comprising 0.5 wt. % of the respective organic friction modifier (FM A, FM B, FM C, FM D, FM E and a glycerol monooleate (GMO) friction modifier) was determined at 100° C. and 130° C. using a Mini Traction Machine (commercially available from PCS Instruments Limited, based in West London, United Kingdom) with a ¾ inch ball on a smooth disc. The load applied was 36N (1 GPa contact pressure) and the speed of rotation was from 0.01 m/s to 2 m/s. Table 1 shows the results at 100° C. and Table 2 shows the results at 130° C.

TABLE 1

| | Evaluation results at 100° C. | | | | | | |
|---|---|---|---|---|---|---|---|
| | Friction modifiers | | | | | | |
| Speed (m/s) | No FM Friction coeff. | FM A Friction coeff. | FM B Friction coeff. | FM C Friction coeff. | FM D Friction coeff. | FM E Friction coeff. | GMO Friction coeff. |
| 0.01 | 0.1000 | 0.0546 | 0.0323 | 0.0559 | 0.0572 | 0.0657 | 0.0721 |
| 0.02 | 0.094 | 0.0522 | 0.0362 | 0.0581 | 0.0498 | 0.0587 | 0.073 |
| 0.05 | 0.0824 | 0.0469 | 0.0377 | 0.0592 | 0.0523 | 0.0491 | 0.0722 |

TABLE 2

| | Evaluation results at 130° C. | | | | | | |
|---|---|---|---|---|---|---|---|
| | Friction modifiers | | | | | | |
| Speed (m/s) | No FM Friction coeff. | FM A Friction coeff. | FM B Friction coeff. | FM C Friction coeff. | FM D Friction coeff. | FM E Friction coeff. | GMO Friction coeff. |
| 0.01 | 0.0864 | 0.0465 | 0.0194 | 0.0447 | 0.0405 | 0.0319 | 0.0753 |
| 0.02 | 0.0857 | 0.0495 | 0.0162 | 0.0519 | 0.0318 | 0.0304 | 0.0737 |
| 0.05 | 0.079 | 0.0442 | 0.0241 | 0.0539 | 0.0274 | 0.0306 | 0.066 |

As can be seen from the results above, the organic friction modifiers of the present disclosure significantly improve the friction reducing properties (i.e. a lower coefficient of friction) of the non-aqueous lubricant composition as compared to state of the art non-aqueous lubricant compositions having no friction modifier or a glycerol monooleate friction modifier.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An organic friction modifier comprising a product formed from the reaction of polyisobutylene succinic anhydride and a hydrophilic polyetheramine at a molar ratio of polyisobutylene succinic anhydride to amino groups in the hydrophilic polyetheramine ranging from about 1:1 to about 6:1 and wherein the product is a friction reducing product.

2. The organic friction modifier of claim 1, wherein the hydrophilic polyetheramine is a polyether monoamine.

3. The organic friction modifier of claim 2, wherein the polyether monoamine has a formula (1) or (1a)

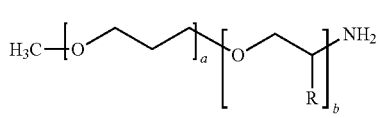
(1)

where R is hydrogen or methyl, and
a and b independently are integers from about 1 to about 150,

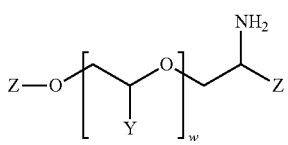
(1a)

where Y is hydrogen or methyl,
Z is a $C_1$-$C_{40}$ alkyl group or a $C_1$-$C_{40}$ alkyl phenol group and
w is an integer from about 1 to about 100.

4. The organic friction modifier of claim 1, wherein the hydrophilic polyetheramine is a polyether diamine.

5. The organic friction modifier of claim 4 wherein the polyether diamine has the formula (3), (4) or (5):

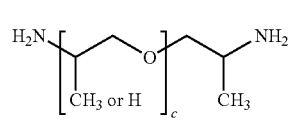
(3)

where c is an integer from about 2 to about 100;

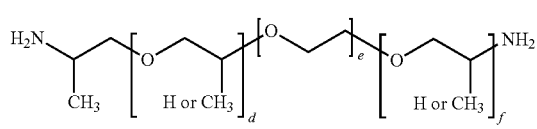
(4)

where e is an integer from about 2 to about 40, and
d and f independently are integers from about 1 to about 10;

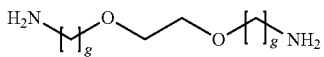

(5)

where g is an integer from about 2 to about 3.

6. The organic friction modifier of claim 1, wherein the hydrophilic polyetheramine is a polyether triamine.

7. The organic friction modifier of claim 6, wherein the polyether triamine has the formula (6)

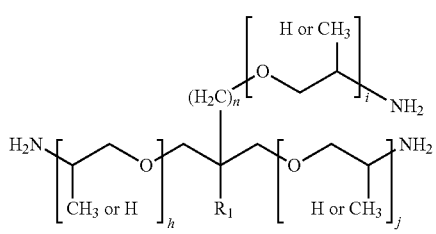

(6)

where $R_1$ is hydrogen, methyl or ethyl, n is an integer of 0 or 1, and h, i and j independently are integers from about 1 to about 100.

8. The organic friction modifier of claim 1, wherein the hydrophilic polyetheramine is a polyether diamine dimer having the formula

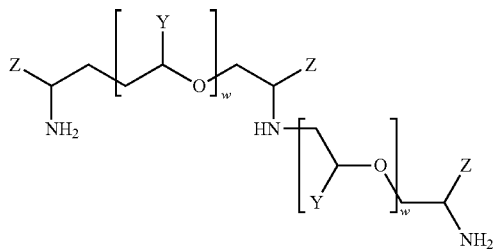

where Y is hydrogen or methyl,

Z is a $C_1$-$C_{40}$ alkyl group or a $C_1$-$C_{40}$ alkyl phenol group and w is an integer from about 1 to about 100.

9. The organic friction modifier of claim 1, wherein the hydrophilic polyetheramine is a polyether tetraamine or a multi-functional polyetheramine.

10. A non-aqueous lubricant composition comprising a base oil and the organic friction modifier of claim 1.

11. The non-aqueous lubricant composition of claim 10, wherein the base oil is a synthetic oil.

12. The non-aqueous lubricant composition of claim 10, wherein the base oil is a mineral oil.

13. A non-aqueous lubricant composition comprising:
A) from 70 wt. % to 99.9 wt. % of a base oil, based on the total weight of the non-aqueous lubricant composition;
B) the organic friction modifier of claim 1; and
C) one or more additional additives;
wherein the combined amount of B) and C) present in the non-aqueous lubricant composition is from 0.1 to 30 weight percent based on the total weight of the non-aqueous lubricant composition.

14. An additive package comprising the organic friction modifier of claim 1 and one or more additives selected from anti-oxidants, anti-wear additives, detergents, dispersants, other friction modifiers, viscosity index improvers, pour point depressants, corrosion inhibitors, defoaming agents and seal fix or seal compatibility agents and mixtures thereof.

15. A method for reducing the friction properties of a non-aqueous lubricant composition comprising adding the organic friction modifier of claim 1 to the non-aqueous lubricant composition.

16. A method for reducing the friction between sliding parts of an engine comprising contacting at least one sliding part with a non-aqueous lubricant composition wherein the non-aqueous lubricant composition comprises a base oil, the organic friction modifier of claim 1 and optionally one or more additives.

* * * * *